Dec. 25, 1923.                                                1,478,486

H. E. REAUME

PISTON RING

Filed June 8, 1922

Harry E. Reaume
Inventor by Ralzemond A. Parker
Attorney

Patented Dec. 25, 1923.

1,478,486

UNITED STATES PATENT OFFICE.

HARRY E. REAUME, OF DETROIT, MICHIGAN.

PISTON RING.

Application filed June 8, 1922. Serial No. 566,878.

*To all whom it may concern:*

Be it known that I, HARRY E. REAUME, a citizen of the United States, residing at Detroit, county of Wayne, State of Michigan, have invented a certain new and useful Improvement in Piston Rings, and declare the following to be a full, clear, and exact description of the same, such as will enable others skilled in the art to which it pertains to make and use the same, reference being had to the accompanying drawings, which form a part of this specification.

My invention relates to improvements in piston packing. The object is to provide piston packing in the form of metal piston rings constructed as hereinafter described, particularly intended for use in connection with internal combustion engines and so formed as to maintain at all times, and notwithstanding wear, a close-fitting gas-tight joint between the piston and the wall of the cylinder in which the piston is working.

A further object is to provide a piston ring so constructed as to prevent oil pumping.

Further, an object is to provide a packing ring so formed that the gases under compression are utilized to hold the ring outwardly against the cylinder wall, making a close-fitting joint therewith.

These and other objects, together with the details of construction and method of operation will more fully appear from the following description, appended claim and accompanying drawing, in which:

Figure 1:
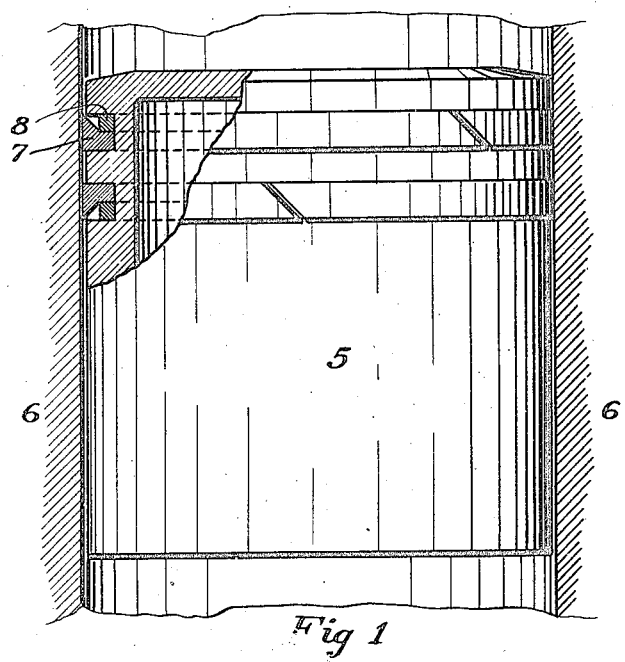
Figure 1 is a side elevation, partly broken away, of a piston carrying my improved rings disposed within the cylinder.
Figure 2:
Fig. 2 is a sectional elevation of the smaller section of my improved ring.
Figure 3:
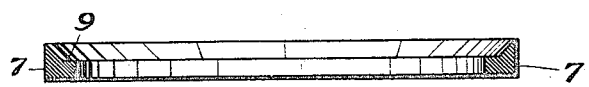
Fig. 3 is a sectional elevation of the larger section of my improved ring.

I am aware that rings have been previously provided which attempted to make use of the gases under compression to provide a tight fitting joint between the ring and the wall of the cylinder. So far as I know, however, these rings differ essentially from my construction here shown. My improved ring presents a large bearing surface to the wall of the cylinder. The ring is so shaped as to make use of the gases under compression to hold the same outwardly against the cylinder wall. The details of the construction of the separate ring sections of the combination and their assembly on the piston follow.

In the drawing, let 5 indicate a piston and 6 the cylinder wall on opposite sides. The piston shown is provided with a pair of substantially parallel annular ring grooves within which are positioned piston rings hereinafter described. Each complete ring comprises a large ring section 7 and a small ring section 8. The large ring section 7 has an outer face substantially the width of the groove which bears against the cylinder wall. This large ring section is undercut from the edge at the cylinder wall inwardly and downwardly to a point 9 well within the groove. As shown in the drawing, this large ring section is undercut on a bevel to a point approximately midway its height and lateral width within the groove.

I provide a second ring section 8 which is substantially rectangular in cross section and which is seated within the groove alongside the large ring section below the bevel thereof and adapted to hold the large ring section sidewise within the groove against the opposite side wall of the groove.

As shown in Fig. 1, when the ring is within the groove and the piston is working, the gases under compression in the combustion chamber will enter the annular groove formed by the undercut beveled faces of the large ring section and will serve to hold such large section outwardly against the cylinder wall and laterally against the opposite side wall of the groove so as to prevent leakage of gas between the packing ring and the cylinder wall or underneath the packing ring and through the groove. The ring section might preferably be made of resilient material having a certain outwardly expansive tendency to assist this action of the gas under compression and to maintain a tight fitting joint between the packing ring and the cylinder wall under normal non-working conditions. The large ring section is shown as beveled to a comparatively sharp edge at the cylinder wall and when the ring becomes heated the gases under compression will hold this edge closely in engagement with the wall of the cylinder in conformity with any irregularities in the contour thereof. The gases will also wedge this section 7 sidewise within the groove against the opposite side wall of the groove to prevent leakage of gas around the large section within the groove and will hold the small ring section against the bottom of the groove and against the large ring section.

As shown in Fig. 1, there is positioned in the lower groove a packing ring similar in construction to that heretofore described but in which the bevel faces in the opposite direction. The outer ring section possesses sufficient resiliency to hold itself outwardly against the cylinder wall, though it is apparent that spring means of any well known form might be used to accomplish this purpose, if desired. The annular groove underneath the undercut face of this large ring section serves as an oil groove. This oil groove is of sufficient size to form a perfect seal when oil is collected therein and would effectively prevent oil reaching the combustion chamber from the cylinder. It will be seen, therefore, that in the assembly shown I have provided packing rings so arranged as to prevent leakage of the compression gases either through the groove or between the packing ring and the wall of the cylinder and also prevent leakage of oil into the combustion chamber portion of the cylinder.

What I claim is:

In piston packing, in combination, a cylinder, a pistion having an annular groove, which piston is disposed in said cylinder for working, packing in said groove comprising a ring section having an outer face substantially the width of the groove bearing against the cylinder wall, which ring section is undercut on a bevel from such outer face to approximately the center of the ring which point is approximately the center of the groove when the ring is disposed therein and then cut away from such point to its inner face on a line substantially parallel the opposite lateral face of the ring which engages a side wall of the groove, and a second ring section substantially rectangular in cross section seated within the groove alongside said first ring section and below the bevel thereof to prevent lateral movement of said first ring section within the groove and to form an annular compression chamber within the groove between a side wall thereof, the outer face of the second ring section and the beveled face of the first ring section.

In testimony whereof, I sign this specification.

HARRY E. REAUME.